United States Patent [19]

McNeely

[11] Patent Number: 4,586,534
[45] Date of Patent: May 6, 1986

[54] CHECK VALVE MECHANISM
[75] Inventor: Michael D. McNeely, Katy, Tex.
[73] Assignee: Daniel Industries, Houston, Tex.
[21] Appl. No.: 602,827
[22] Filed: Apr. 23, 1984
[51] Int. Cl.[4] ............................................. F16K 15/03
[52] U.S. Cl. ............................ 137/515.7; 137/516.29;
137/527; 137/527.4
[58] Field of Search ................ 137/515.7, 516.29, 527,
137/527.4, 527.8

[56] References Cited
U.S. PATENT DOCUMENTS

| | | | |
|---|---|---|---|
| 1,822,655 | 9/1931 | Hamilton | 137/527.4 |
| 2,282,532 | 5/1942 | Shenk | 137/527.4 |
| 2,934,084 | 4/1960 | Adams | 137/527.4 |
| 3,074,427 | 1/1963 | Wheeler | 137/527.4 X |
| 3,075,547 | 1/1963 | Scaramucci | 137/527.2 X |
| 3,933,173 | 1/1976 | Kajita | 137/515.7 X |
| 3,937,441 | 2/1976 | Baumann | 137/527 X |
| 4,230,150 | 10/1980 | Scaramucci | 137/527 |
| 4,274,436 | 6/1981 | Smith | 137/527 X |

Primary Examiner—Robert G. Nilson
Attorney, Agent, or Firm—Gunn, Lee & Jackson

[57] ABSTRACT

A check valve mechanism providing a valve body and valve seat assembly having noncircular eccentrically located hinge pin receptacles with independently controlled X-axis and Y-axis hinge pin locating surfaces. A simple cylindrical hinge pin is supported in the receptacles and supports a check valve disc in such manner that both opening and closing movements have components of rotary and linear disc movement relative to the hinge pin and valve seat of the valve mechanism.

17 Claims, 10 Drawing Figures

CHECK VALVE MECHANISM

FIELD OF THE INVENTION

This invention relates generally to check valves which permit unidirectional flow of fluid within a flow-line system and more specifically is directed to a check valve mechanism which incorporates a pivotal disc for the prevention of flow reversal in flow lines and provides the combination of linear poppet valve-like activity and rotating disc activity in the opening and closing movements thereof.

BACKGROUND OF THE INVENTION

Many check valves, especially for pipeline service, are manufactured with a rotatable disc for sealing which is supported within a valve chamber by means of an eccentric shaft arrangement. Both opening and closing movements require simple pivoting of the eccentrically supported disc about the support pin which is also referred to as a hinge pin. Since the valve disc must pivot into sealing contact with the seat of the valve, orientation of the hinge pin relative to the valve seat is critical and formation of sealing surfaces on the valve disc and seat is also critical. Although the valve design is of fairly simple nature, manufacture of the valve can be quite expensive since many critical surfaces within the valve must be generated relative to other critical surfaces. For example, the hinge pin support bores must be positioned in offset relation from both the center line of the flow passage and the plane of the valve seat. Expensive valve alignment problems may exist, which is of course detrimental to the commercial feasibility of the product.

In many cases, pivoting disc type check valves require the provision of a split body construction which requires complex machining and also require the provision of an efficient seal between the body sections. It is desirable to provide a check valve mechanism wherein a unitary body structure is provided to thus minimize manufacturing costs and reduce the possibility of seal failure while in service.

Many pivoting disc type check valves employ hinge pin disc supporting members having the ends thereof exposed externally of the valve. In some cases, the hinge pins must be sealed with respect to the valve body and leakage of such seals is a common misfunction, requiring the flow system to be shut down for valve replacement or repair. In other cases, closer plugs are threaded into the valve body to close and seal pivot pin openings. Where the plugs also function as bushings, plug positioning is critical and expensive.

Most pivotal disc type check valves are of relatively low pressure design and cannot be readily adapted for low pressure or high pressure service. It is desirable to provide a check valve mechanism incorporating a basic functional design which is readily adaptable to both high pressure and low pressure conditions, and is further adaptable through selective use of a variety of trim materials for various types of corrosive and erosive surface.

SUMMARY OF THE INVENTION

It is a primary feature of the present invention to provide a novel check valve mechanism incoporating a rotating disc supported by an eccentric shaft or pivot pin, wherein the disc has linear and rotational components of movement in both opening and closing movements thereof.

It is also a feature of this invention to provide a novel check valve mechanism incorporating a unitary body structure and a disc pivot which is not exposed externally of the valve.

It is an even further feature of this invention to provide a novel pivoting disc type check valve which is readily adaptable to sealing by means of a soft resilient seal and metal-to-metal sealing.

It is also a feature of this invention to provide a novel pivotal disc type check valve mechanism being so designed as to allow metal-to-metal sealing strength to be effectively controlled through control of the contact area of the seat and disc to eliminate yielding at higher pressure and subsequent dimensional changes in pin location as a result of such pressure responsive yielding.

It is also an important feature of this invention to provide a novel pivotal disc type check valve mechanism which employs a slotted insert for pivot pin location thus eliminating any necessity for drilling holes offset from the valve center line.

It is another feature of this invention to provide a novel pivotal disc type check valve mechanism incorporating a spring system to provide a spring reaction force which normally closes the valve with light spring pressure and cooperates with the flowing fluid forces to thus position the valve for closure as the flow conditions through the valve nears zero, to thus permit efficient valve closure without slamming.

Among the several features of this invention is noted the contemplation of a novel pivotal disc type check valve mechanism incorporating a multi-function seat insert which provides a seating surface for sealing with the valve disc, provides for hinge pin entrapment, and functions to assist in spring retention.

It is another feature of this invention to provide a novel pivotal disc type check valve mechanism requiring no alignment between the valve seat and body and insuring that there are no concentricity requirements in any mating parts of the valve mechanism.

It is an even further feature of this invention to provide a novel pivotal disc type check valve mechanism employing a garter spring for retention of the seat insert in assembly with the body structure, thus eliminating the need for seat retention structure of more critical and expensive nature.

It is another primary feature of this invention to provide a novel pivotal disc type check valve mechanism which is readily adaptable to a wide variety of service conditions, is reliable in use and low in cost.

Other and further objects, advantages and features of the invention will become obvious to one skilled in the art upon an understanding of the illustrative embodiments about to be described and various advantages not referred to herein will occur to one skilled in the art upon employment of the invention in practice.

Briefly, a check valve constructed in accordance with the present invention may include a simple circular body structure which may be efficiently bolted between the flanges of pipe sections. The body structure is of simple nature and can be efficiently formed by means of centrifugal casting operations from inexpensive material or it may be formed from ring-rolled forgings, machined from stock, or cast in a more conventional manner. Within the body structure is located a seat insert having a frusto-conical seat surface which is engaged by a mating frusto-conical sealing surface of a pivotal disc type check valve member. The seat insert is initially locked in assembly with the body by means of a garter ring and is readily removable for replacement or repair as necessary. After assembly in the flow line the insert is retained by a pipe flange. The seat insert defines opposed, noncircular slots which receive the end portions of a simple cylindrical hinge pin that supports the valve disc for pivotal movement within the flow passage of the valve. A double torsion type spring is provided which is wound about the pivot pin with opposed arms respectively engaging the valve body and valve disc to develop a spring reaction force tending to shift the disc to its closed position. The reaction force developed on the disc by the double torsion spring is of minimal force value being in the order of a few ounces of mechanical force in small size valves anbd a few pounds of force in large size valves. Closure of the valve disc is assisted by a counterweight system designed into the valve disc.

Noncircular slot support of the disc in assembly with the hinge pin permits the valve disc to have components of both linear and rotary movement relative to the hinge pin and valve seat during both opening and closing valve activities. Initial opening of the valve is accomplished by a component of linear disc movement which unseats the disc from the tapered valve seat and retracts it to a pivotal position. This initial linear movement is followed by a component of rotary movement wherein the disc member pivots about the hinge pin and becomes oriented in substantially parallel relation to the direction of fluid flow through the valve. The double torsion spring is retained in such manner that, should it break, the broken spring parts will be effectively retained by the valve structure and will not fall into the flow passage and be carried downstream by the flowing fluid.

The noncircular or rectangular slot in the seat insert is formed by generating slot forming surfaces which are independently dimensioned and can be machined independently to provide for modification of operational characteristics of the valve.

BRIEF DESCRIPTION OF THE DRAWINGS

In order that the manner in which the above recited advantages and objects of the invention are attained and can be understood in detail, a more particular description of the invention briefly summarized above may be had by reference to the specific embodiments thereof which are illustrated in the appended drawings, which drawings form a part of this specification. It is to be understood, however, that the appended drawings illustrate only typical embodiments of this invention and therefore are not to be considered limiting of its scope, for the invention may admit to other equally effective embodiments.

Figure 2:
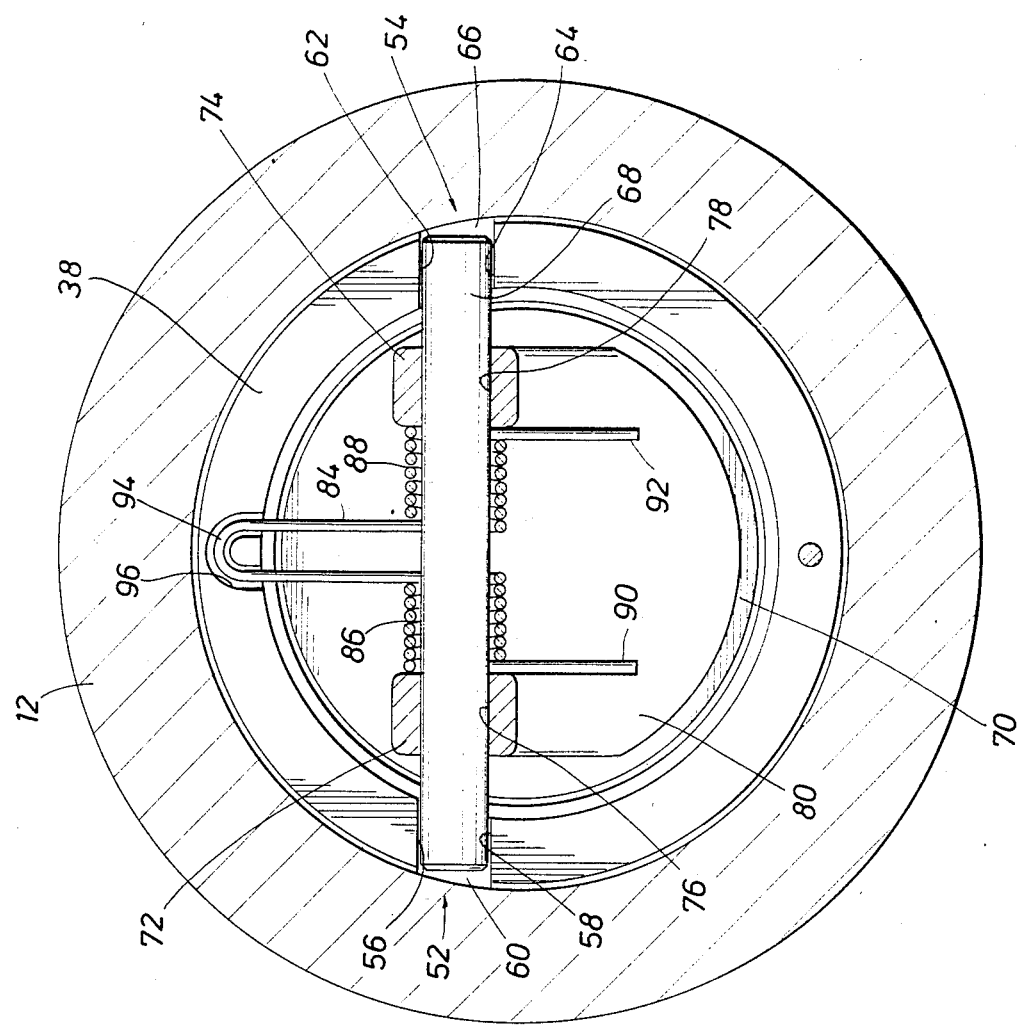
Figure 1:
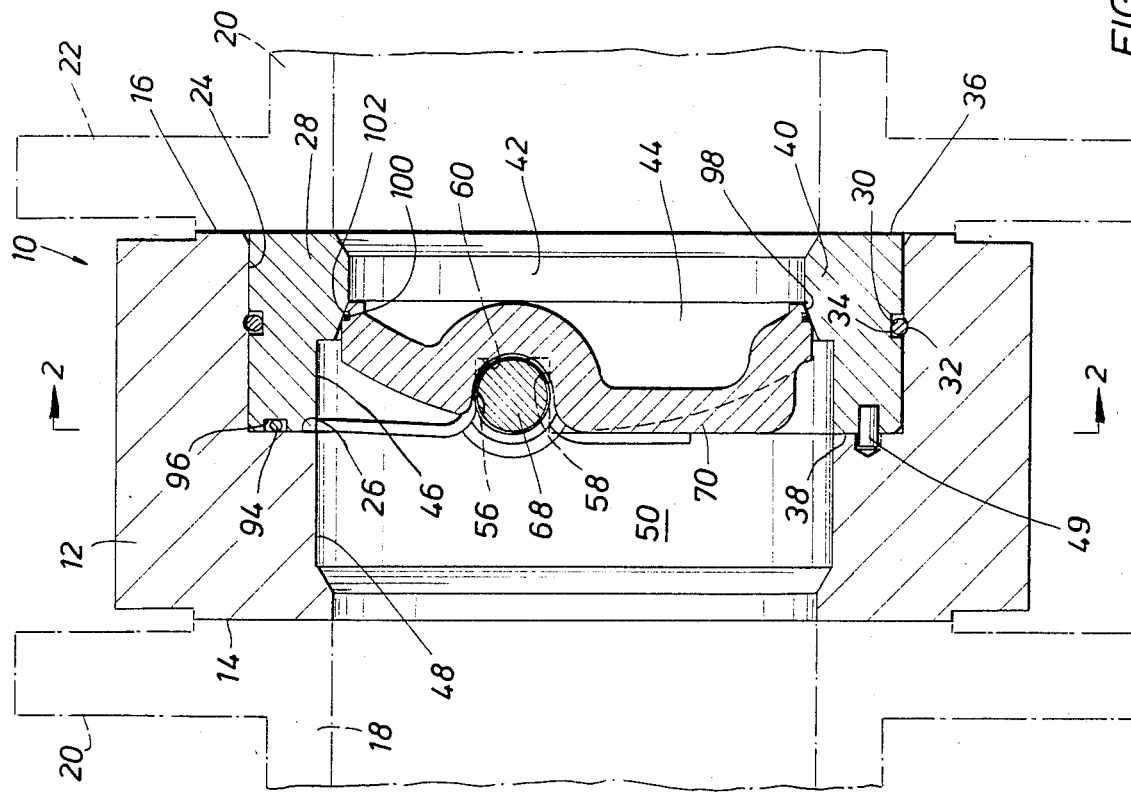

IN THE DRAWINGS;

FIG. 1 is a cross-sectional view of a pivotal disc check valve mechanism which is constructed in accordance with the present invention and which is shown to be positioned between pipe flanges shown in broken line and which is further shown with the check valve disc thereof in its fully seated and sealed relationship to the valve seat.

FIG. 2 is an elevational view of the check valve mechanism taken along line 2—2 of FIG. 1.

Figure 3:
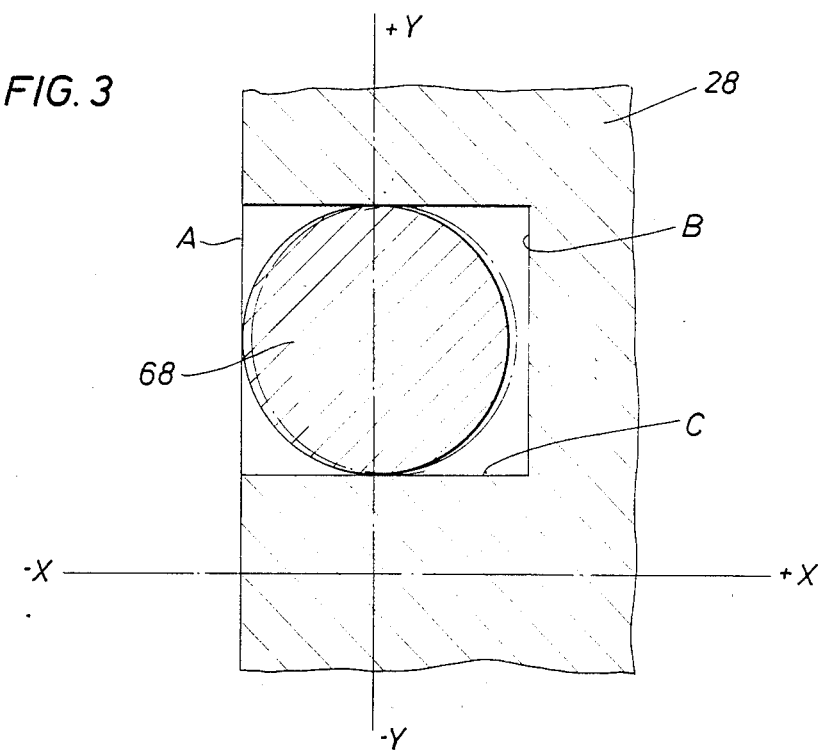

FIG. 3 is a fragmentary sectional view of the valve seat structure of FIG. 1 showing the relation of the pivot pin to the pin supporting slot of the seat insert.

Figure 5:
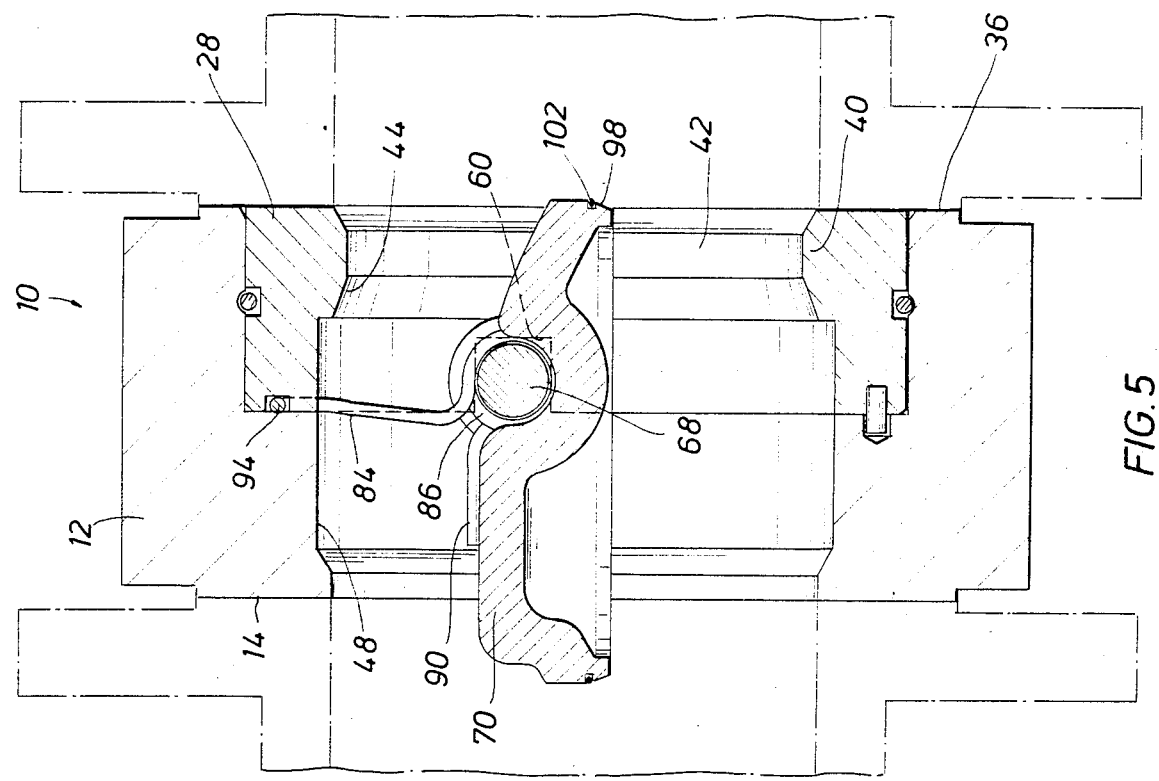
Figure 4:
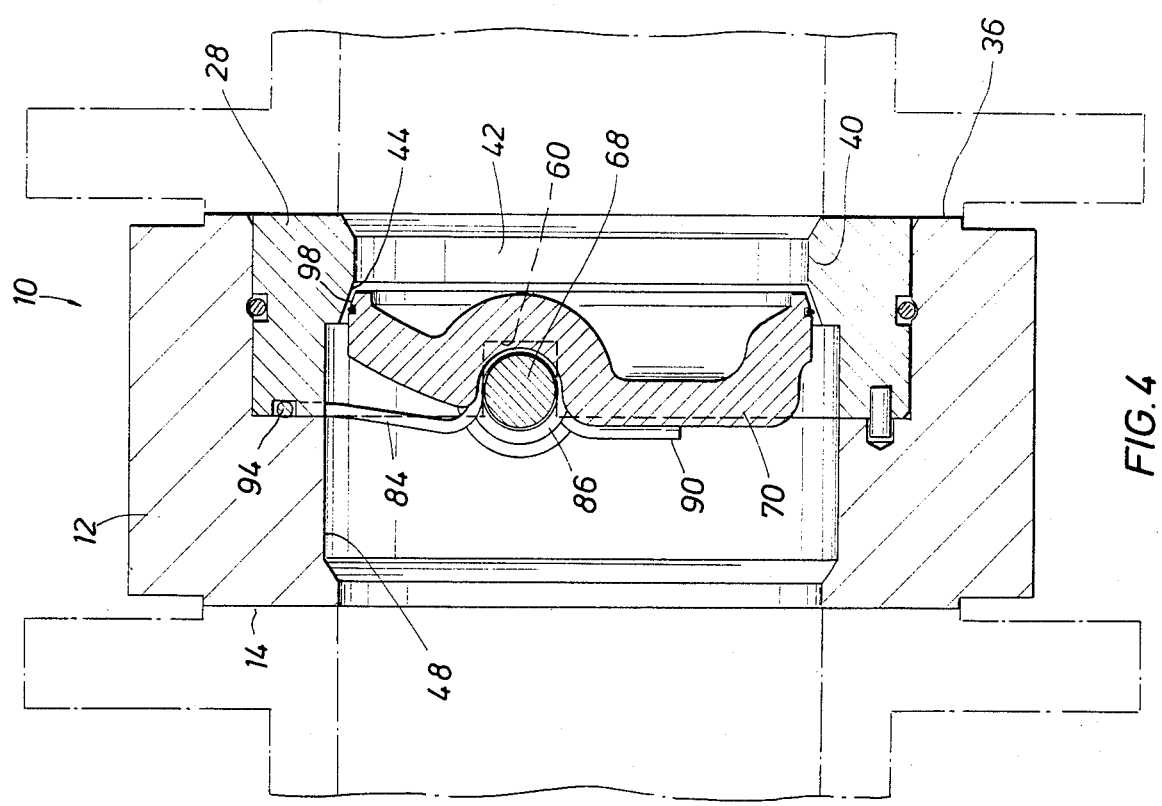

FIG. 4 is a partial sectional view of the valve of FIG. 1. showing the disc in its unseated position. FIG. 5 is a similar partial sectional view of the valve mechanism of FIG. 1 showing the check valve disc rotated to its open position.

Figure 6:
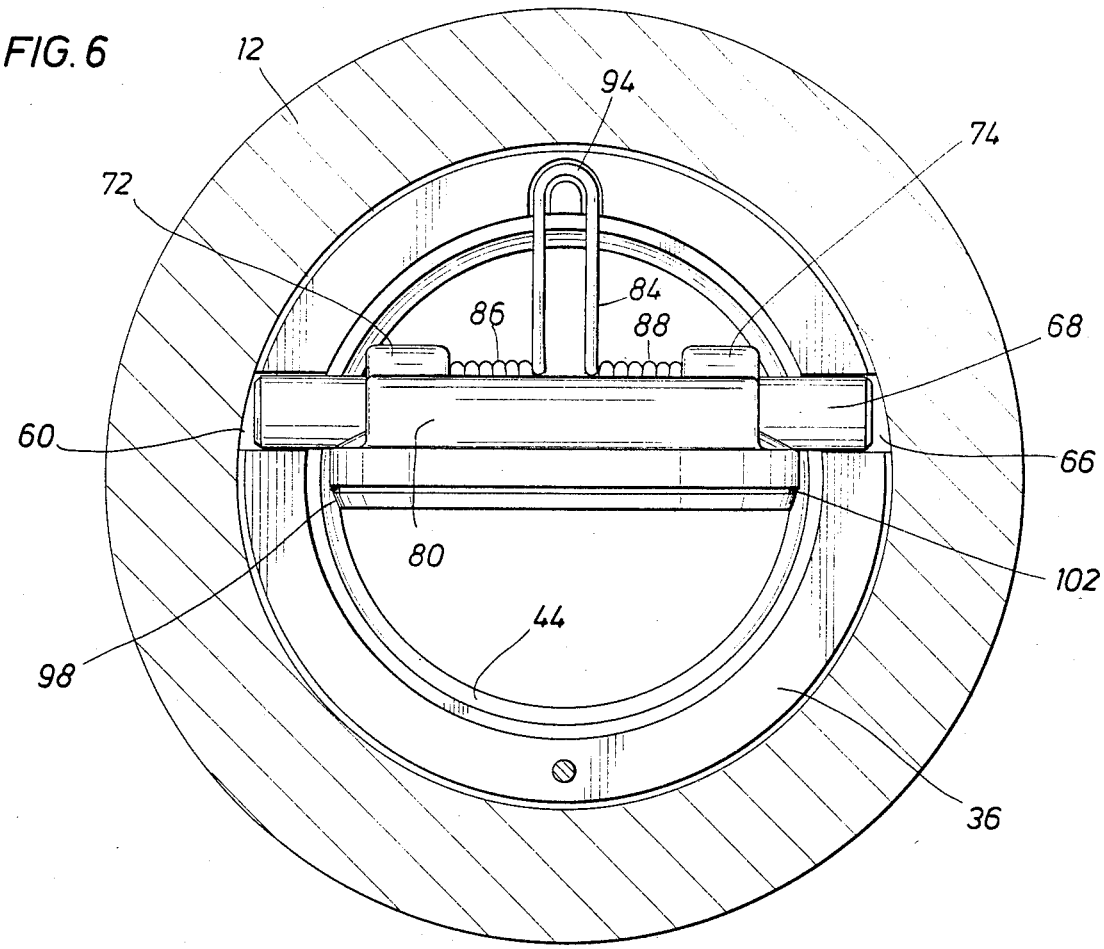

FIG. 6 is an elevational view of the valve in its open positioning showing the position of the disc member relative to the circular wall structure of the valve bore.

Figure 7:
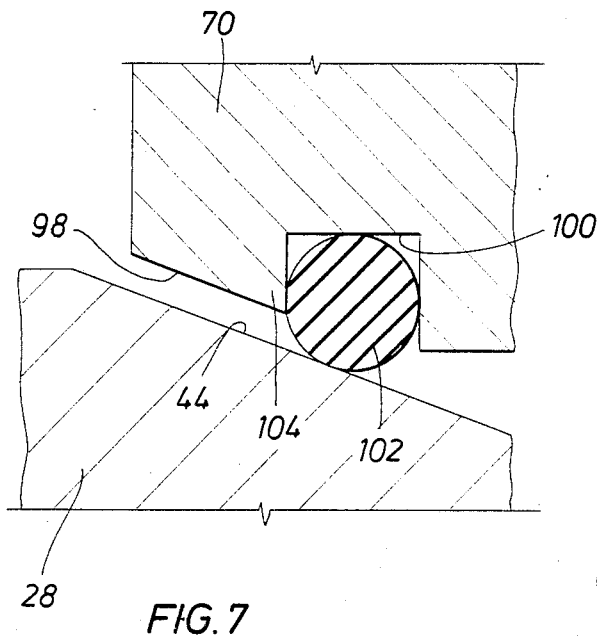

FIG. 7 is a fragmentary sectional view of the valve seat and disc showing initial sealing engagement by means of the elastomeric sealing member of the disc.

Figure 8:
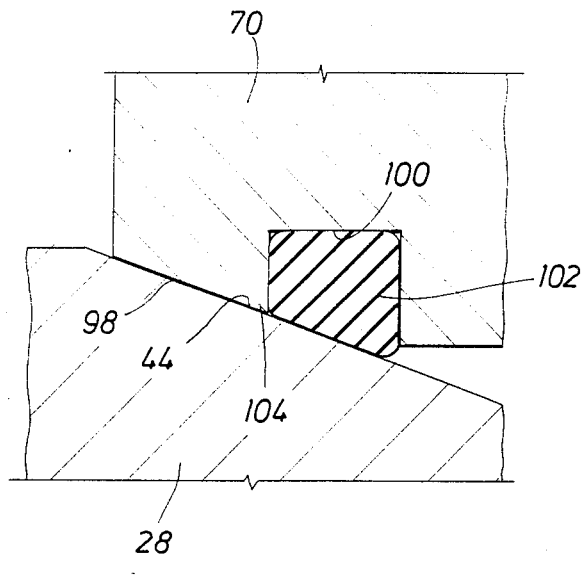

FIG. 8 is a fragmentary sectional view similar to that of FIG. 7 and showing the fully seated relationship of the valve disc with the seat surface with metal to metal sealing established between the disc and seat.

Figure 9:
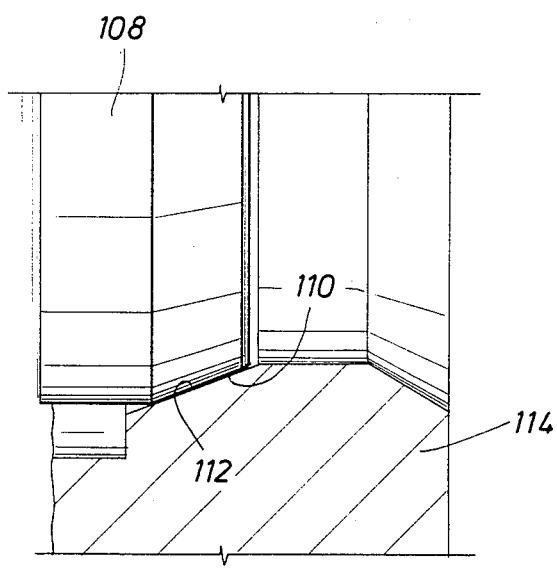

FIG. 9 is a fragmentary sectional view of a pivotal disc type check valve mechanism representing an alternative embodiment of the present invention designed for metal to metal sealing only.

Figure 10:
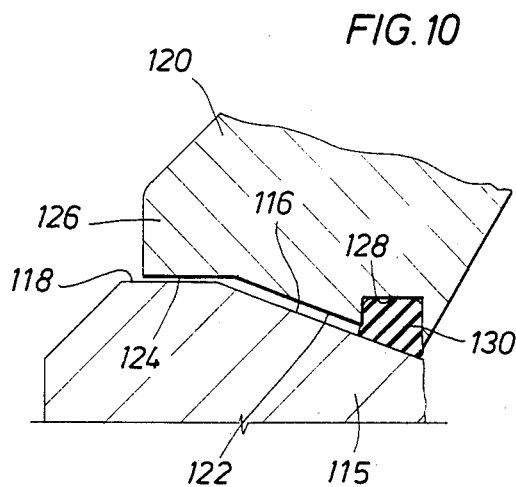

FIG. 10 is a fragmentary sectional view of a pivotal disc check valve representing another embodiment of this invention.

DETAILED DESCRIPTION OF PREFERRED EMBODIMENT

Referring now the drawings and first to FIG. 1, a pivotal disc type check valve is illustrated generally at 10 incorporating a circular valve body 12 defining opposed sealing faces 14 and 16 for sealing engagement with pipe sections 18 and 20 shown in broken line and having pipe flanges 20 and 22 between which the valve is located. Ordinarily, bolts, now shown, are utilized to draw the pipe flanges into sealing and supporting engagement with the valve body 12 with sealing being established by gasket members of any suitable character. The design of the valve body is such that it is efficiently cradled within the circle of bolts that holed the pipe flanges and valve in assembly. If the valve is too large or too small in comparison to the flow-line size, it will not fit in properly centered relation within the encircling cradle of bolts. Thus, installation personnel will be immediately aware if the size of the valve is not proper for the flow line and improper valve installation is less likely to happen.

The valve body 12 defines an internal seat recess which is formed by a cylindrical internal surface 24 and a radial planar surface 26. A multi-function seat member 28 is positioned within the seat recess and is secured therein by means of a garter spring 30 which is a helically wound flat wound metal spring in the form of a circle that is received within a circular spring recess formed by registering grooves 32 and 34 defined internally of the body and externally of the seat insert, respectively. The garter spring is specially designed for retention of the seal insert in assembly with the valve body prior to assembly of the valve between the pipe flanges thus eliminating the need for screws or other mechanisms of retention. The garter spring does not reduce the gasket seating contact area as would be the case if screws or other devices were utilized to secure the seat in assembly with the valve body. This is of primary importance from the standpoint of rendering the various valve parts less expensive by minimizing the total number of operations and consolidating the function of the parts where possible.

The seat insert further defines a face sealing surface 36 and a planar abutment surface 38. In its fully seated position, the abutment surface 38 is in engagement with planar surface 26 of the seat recess and the face sealing surface 36 is in coplanar relation with the sealing surface 16 of the valve body. As explained above, gasket members will be placed in engagement with the sealing surfaces 14 and 16 of the valve body and 36 of the seat insert and will thus establish sealing between the valve body, seat insert and sealing faces of the pipe sections 18 and 20.

As also indicated above, the seat insert 28 is a multi-function element which effectively minimizes the cost of the valve assembly. The seat insert provides a seating surface which is engaged by a pivotal disc check valve member. The seat insert also provides for pivot pin entrapment and serves as a spring retainer to secure a portion of the double portion valve spring in positively retained assembly with the body structure. Each of these multi-function features will be described in detail hereinbelow.

The seat insert 28 forms an inwardly extending circular valve seat 40 which defines a flow port surface 42 forming the smallest dimension of the flow passage through the valve and also forming a frusto-conical seat surface 44. The seat insert also forms a cylindrical opening 46 corresponding to the size of a cylindrical body opening 48 and cooperating therewith to define a portion of the flow passage 50 of the valve. A roll pin 49 is received within aligned openings of the valve body and seat insert and serves the ensure proper alignment of the seat insert and other internal components relative to the body 12.

Another function of the seat insert is that of providing pivot pin support and entrapment relative to the valve body structure. As shown in FIGS. 1 and 2, the seat insert 28 defines opposed noncircular pin recesses shown generally at 52 and 54 in FIG. 2. Although shown to be of rectangular form, such is not intended to limit the scope of this invention in any manner whatever. Pivot pin recess 52 is defined by parallel surfaces 56 and 58 which are oriented in substantially parallel relation with the center line of the valve flow passage 50. The pivot pin recess 52 is also formed by a transverse surface 60 which is disposed in substantially normal relation with the center line of the valve flow passage. At the opposite side of the seat insert, parallel surfaces 62 and 64 cooperate with a transverse surface 66 to define the pivot pin recess 54. Surfaces 62 and 64 are coplanar relative to the opposite surfaces 56 and 58 and surface 66 is coplanar with surface 60 of the pivot pin recess 52. The purpose of the pivot pin slots 52 and 54 is for entrapped retention of the extremities of a pivot pin 68 in such manner as to provide for valve opening and closing movement having components of both linear and rotary movement. This feature will be discussed in detail hereinbelow.

In order to control the flow of fluid through the valve mechanism, thereby insuring unidirectional flow, a valve disc 70 is pivotally supported by the pivot pin 68. For such support, the disc member 70 defines spaced boss portions 72 and 74 forming passages 76 and 78 respectively receiving the pivot pin 68. Although the disc member 70 is pivotally supported by the pin 68, the registering pivot pin openings 76 and 78 are of slightly larger diameter as compared to the diameter of the pivot pin to thus permit the disc to shift laterally into optimum seating engagement with the valve seat. This feature also allows the disc valve member 70 to have both linear and rotary movement relative to the pivot pin. In other words, a relatively loose fit exists between the pivot pin openings 76 and 78 and the pivot pin allowing various relative orientations of the pivot pin and disc as is necessary for efficient valve activity.

It is desirable that the disc member 70 be at its closed or substantially closed condition in absence of fluid within the valve or fluid flow conditions through the valve. Such positioning of the valve disc is accomplished in part because of the eccentrically weighted condition thereof due to eccentric positioning of its supported relationship with the pivot pin. Further, a counterweight boss 80 is provided on the disc to further insure its movement to the closed position in absence of other forces. To even further assist in movement of the valve disc to its closed position, a spring member is provided as shown at 84 which is in the form of a double torsion spring having opposed portions 86 and 88 thereof forming multiple loops through which the pivot pin 68 extends. The spring 84 also defines a pair of terminal extremities 90 and 92 which transmit spring reaction forces to the disc member 70. The spring member 84 further defines a reverse bent portion 94 which is received within a spring recess 96 of corresponding U-shaped configuration formed in face 38 of the seat insert. The dimension of the spring recess 96 is such that the upper U-shaped portion 94 of the spring member protrudes slightly from it and therefore causing the spring to be locked between the valve seat insert 28 and the planar surface 26 of the valve body. Should the spring break due to metal fatigue after extended service, it is desirable to insure that no portion of the broken spring falls into the flow passage of the valve and is thus carried downstream by the flowing fluid. Any spring breakage is almost certain to occur at the region where the U-shaped upper portion of the spring merges with the multiple looped portions 86 and 88 thereof. Should the spring break in this manner, the upper U-shaped portion will be positively locked in assembly with the valve body and seat insert while the lower multiple looped portions thereof will remain secured about the pivot pin 68.

As mentioned above, the circular seat member 28 forms opposed pin retainer slots or receptacles for retention of the extremities of the hinge pin 68. As also mentioned above, the conventional support system for a hinge pin is through provision of drilled holes in the valve body which must be bored to achieve accuracy of location relative to the valve center line and seat surface. Ordinarily these drilled and bored holes are offset from the valve center line, thereby providing concentricity requirements and alignment requirements which are difficult and expensive to maintain. In accordance with the present invention, the hinge pin is supported in unique manner and is permitted a certain degree of linear movement relative to the valve body structure. Referring now to FIG. 3, the hinge pin and pin retention slot arrangement is described in terms of surface relationships to facilitate understanding. The seat insert 28 is machined to form the opposed pin retention slots or receptacles shown at 52 and 54 in FIG. 2. One of these slots and its relationship to the hinge pin is described in graphical terms in FIG. 3. The opposed hinge pin slots can be efficiently milled so as to establish very accurate location of the slots from the center line of the seat opening and thus the center line of the valve bore. The most important aspect of this is evident from a detailed analysis of the pin locating requirements. With the noncircular slot, critical surfaces "A", "B", and "C" can be independently controlled. With drilled holes for pivot pin retention this is not possible. As the drill center location is changed, all coordinates on the hole diameter shift accordingly. However, with the pin retention slot arrangement of the present invention, the Y-axis offset (surface "C"), the X-axis locating surfaces "A" and "B" can all be dimensioned and machined independently. Therefore, valve operational characteristics can be modified by individual modification of the slot forming surface locations on the seat insert.

The location of surface "A" is the critical surface for proper location from the seat along the X-axis. The location of surface "C" is critical for the control of toe or heel drag and is responsible for initial centering of the disc as it enters the seat. The surface "B" location provides clearance for hinge pin movement toward the seat. Under back pressure as the seat is stressed and the disc moves into the seat, it is essential that the hinge pin not come into contact with surface "B". If this did occur, a reverse rotational torque would be applied to the disc as a result of the pivot established by the hinge pin. The valve is presently designed for back seating to cause a poppet valve closure characteristic with fully distributed pressure forces on the disc. A critical element of this design requires efficient control of surface "B". It can be seen that the flexibility of this design far exceeds that of conventional valve designs involving hinge pin location by means of drilled and bored holes. It is important to bear in mind that an important key to the present design is that each surface forming the hinge pin retention slots is located independently of each of the other surfaces. The hinge pin slots are shown in the drawings as being rectangular. It should be borne in mind, however, that the hinge pin slots may take any other suitable form which permits the desired amount of hinge pin movement relative to the pin supporting slots receiving the extremities thereof. The use of slots for hinge pin support permits both slots to be machined without translation of the machine axis. This reduces an opportunity for error and minimizes the cost of the resulting valve construction.

Also referring to FIG. 3, it is important to note that the double torsion spring member 84 also provides spring reaction forces which, coupled with fluid developed forces on the disc member, cause optimum valve opening and closing activity. With the double torsion spring retained in the manner shown in FIGS. 1 and 2, a force is exerted on the hinge pin in the (−X) direction forcing the hinge pin against surface "A" in the open position. This spring reaction force and the flowing fluid forces keep the hinge pin located against surface "A" during normal flow conditions. Thus, hinge pin 68 remains in engagement with surface "A" as long as there is no reverse flow or consequently reverse pressure. As normal flow through the valve is reduced, the valve disc moves progressively toward its closed position until at substantially zero flow it assumes a position completely perpendicular to the pipe center line. As the fluid reaches very low flow condition, the pressure induced force on the inlet face of the disc becomes very evenly distributed and causes the disc to move downstream in linear manner, with its sealing face perpendicular to the center line of the flow passage, such as in the manner of a poppet valve, with equal flow around the circumference of its disc. A further reduction in flow and a subsequent shift in differential pressure causes the valve disc to move as a poppet valve into the seat with no seal drag. For sealing, it should be noted that the disc member 70 forms a frusto-conical sealing surface 98 which corresponds to the taper of the frusto-conical seat surface 44 of the seat insert 28. For low pressure sealing capability, the valve disc 70 defines a circular seal groove 100 within which is located a circular resilient sealing member 102 such as might be composed of any one of a number of suitable rubber-like resilient materials or a sealing material of greater structural integrity, such as polytetrofluorethylene or any other fluorocarbon material. The sealing member 102 may take the form of a simple O-ring type sealing member and provides for better control of tolerances of the rubber molded part and a wide range of material selections. All O-ring type sealing members are molded to military standard tolerance and all materials are readily available for a wide range of service applications. The O-ring sealing member is designed to be stretched in the range of from about 2% to about 12% or more preferably in the range of from about 6% to about 9% on installation. The seal groove formed in the disc is specially designed for accurate axial location of the O-ring sealing member in the valve disc.

The use of tapered, frusto-conical sealing surfaces on the seat insert permits elimination of conventional disc stops in the closed position of the disc and allows the metal-to-metal seat stress to be effectively controlled. The contact area of the disc and seat can be controlled to eliminate yielding at higher pressure and subsequent dimensional changes in pin location as the result of such yielding.

The pivotal disc member provides a frusto-conical seal which moves into simple abutting contact with the correspondingly tapered seat surface in the same manner as would an axial poppet valve. In other words, from a slightly open or unseated position as shown in FIG. 4, the valve disc simply moves linearly into contact with the seat surface as shown in FIG. 1. This seating activity is reversed when the flow through the valve returns to normal. As the inlet pressure is raised, the valve disc becomes unseated and moves linearly in the (−X) direction with no rotation until the hinge moves into contact with surface "A". Since the valve disc is eccentrically secured to the hinge pin, a fluid dynamic torque is induced to the valve disc causing it to pivot about the hinge pin and toward its open position in relation to the flow velocity as shown in FIG. 5.

OPERATION

The closed position of the valve is shown in FIG. 1. In this position the tapered sealing surface 98 of the disc member 70 is in metal-to-metal surface contact with the frusto-conical seat surface 44 of the seat insert 28. As shown in greater detail in the full line position of FIG. 3, the hinge pin 68 will be in spaced relation with surface "B", thereby allowing the disc member 70 freedom of movement responsive to the force developed by line pressure together with the light spring force of the double torsion spring 84. The torsion spring develops only sufficient reaction force on the disc member to insure its movement to the closed position in absence of a flowing condition within the valve. As valve closure occurs, initial sealing engagement is established by the circular resilient seal 102 in the manner shown in FIG. 7. The sealing member 102 will establish sealing contact with the tapered sealing surface 44 of the seat member while a condition of stand-off occurs between the seat surface 44 and the tapered sealing surface 98 of the disc member. As the pressure differential increases, the disc member 70 will move linearly to the position shown in FIG. 8 where the sealing member 102 is compressed within its groove and the tapered surfaces 44 and 98 are in metal-to-metal sealing contact. Any tendency of the O-ring sealing member to be extruded from its groove is prevented by a circular seal retaining lip 104 formed at the intersection of the seat groove with the tapered sealing surface 98.

As a pressure differential develops across the disc member 70 in the direction of the flow arrow shown in FIG. 1, the valve disc will immediately begin its opening movement. Initial opening movement begins by linear disc movement in the downstream direction, causing it to become unseated in poppet valve manner and thus causing surface "A" of the pivot pin slots to move into contact with the pivot pin as shown in full line in FIG. 3. The unseated condition of the valve disc is shown in FIG. 4. In this condition, flow will occur about the entire periphery of the disc member. Upon contact between surface "A" with the pivot pin, the valve disc will begin its pivoting activity, thus pivoting about the pivot pin 68 to the open position shown in FIG. 5. As shown in the fragmentary sectional view of FIG. 9, an alternative embodiment of the present invention may be provided wherein a seat insert 114 may take the identical form shown at 28 in FIG. 1 and the valve body in which the seat insert is retained may also be identical with body 12 of FIG. 1. In the embodiment of FIG. 9, the disc member 108 is provided with a tapered metal sealing surface 110, which does not include a circular resilient sealing member. In this embodiment, valve sealing is accomplished solely by means of the metal-to-metal sealing contact established between the tapered surface 110 of the disc and the tapered seat surface 112 of the seat insert.

Referring now to FIG. 10, a further embodiment of this invention is disclosed wherein a valve seat insert may take the form shown at 115 which defines a tapered valve seat surface 116 and a cylindrical seat surface 118. A valve disc member 120 may be provided having a tapered sealing surface 122 disposed for mating sealing engagement with the tapered sealing surface 116. The valve disc 120 also defines a cylindrical internal surface portion 124 which is only slightly smaller than the cylindrical surface 118. Surface 124 cooperates with the general curvature of the disc to form a circular seal retaining rim portion 126.

A circular seal groove 128 is located at the upstream extremity of the tapered sealing surface 122. A circular resilient sealing member 130 is retained within the seal groove 128 and establishes sealing engagement with the upstream portion of the tapered seat surface 116. Valve closure occurs with the valve disc pivoting to a position where the cylindrical surfaces 118 and 124 become positioned in concentric manner. Thereafter, the force induced by differential pressure causes the disc member to shift linearly in a downstream direction causing the circular rim portion 126 to enter the cylindrical opening defined by surface 118. This linear downstream movement will continue until the circular sealing member 130 establishes sealing contact with surface 116 of the valve seat. If the closing pressure differential is of low magnitude, sealing may be maintained solely by the resilient sealing member 130. If a higher pressure differential exists, the disc member will be moved linearly in a downstream direction until metal-to-metal sealing contact is established between tapered sealing surfaces 116 and 122. In this condition, the disc member will be supported by its contact with the valve seat, thereby evenly distributing seating forces through the valve seat to the valve body structure. Surfaces "B" of each of the pivot pin receptacles will have been maintained in spaced relation, i.e., out of contact with the pivot pin of the valve allowing valve seating forces to be evenly distributed to the seat insert.

The multifunction seat insert of this valve provides a seating surface for engagement by the sealing surface of the valve disc. It also provides for pin entrapment, enabling the pivot pin of the valve to be positively retained without any need for pin apertures which might be exposed to the atmosphere and require pivot seals between the pin and body. The seat is machined in the insert with the slots held to a close dimension from the seat center line. This allows the insert to float, if necessary, because no matter how much it moves, the pivot pin location moves within it and the relationship between pivot pin location and seat center line remains unchanged. This allows the complete functional performance of the valve to be controlled solely by the seat insert. There are no alignment requirements between the valve seat and body and no requirements for concentricity in any of the mating parts. The multifunction seat insert also serves to contain the double torsion spring of the valve and thus allows the valve body to be in the form of a simple circular housing which is easily manufactured from inexpensive centrifugally cast material. The multifunction seat insert and its relation with the valve body and valve disc also permits the valve body and trim materials to be different so that lesser expensive body materials can be employed when corrision resistant stainless steel trim is desired. The operation and construction of check valves according to the present invention is defined by several important improvements as compared with standard eccentric pivotal disc type check valves. The valves provide an eccentric shaft arrangement with a rotating disc. The major differences include a tapered seat with the seal installed within the disc. The hinge pin of the valve is movably secured within pivot pin slots rather than being immovably retained within circular holes as is typically the case. A spring arrangement is provided that through proper use of reaction forces plays an important role in the valve closing action. The valve body requires no tapped holes for hinge pin insertion. This eliminates the problems ordinarily encountered with pipe plug make-up and hinge pin retention. The body structure of the valve is not split in the external pressure boundary as is typical with most check valves of this character. The body rather requires only a split gasket surface which maintains full gasket seating surfaces for proper gasket stress on installation and operation. The seat insert is also retained in the body with a simple garter spring arrangement that allows easy assembly and disassembly while at the same time adequately securing the seat assembly to the valve body prior to installation of the valve.

In view of the foregoing, it is evident that this invention is one well adapted to attain all of the objects and features hereinabove set forth together with other features which are inherent in the description of the apparatus itself. It will be understood that certain combinations and subcombinations are of utility and may be employed without reference to other features and subcombinations. This is contemplated by and is within the scope of the present invention.

What is claimed is:

1. A check valve mechanism, comprising:

(a) body means of generally circular form defining a flow passage and defining an annular seat recess, an annular seat insert being disposed within said seat recess and having internal generally circular seat means forming a portion of said flow passage, said body means having a substantially horizontal center-line forming an X-axis and defining a Y-axis oriented in normal relation with X-axis, said annular seat insert further having opposed hinge pin receptacles of generally rectangular form with independently controlled X-axis hinge pin locating surface means and Y-axis hinge pin locating surface means, said hinge pin receptacles being eccentrically located with respect to the intersection of said X and Y axes;

(b) a hinge pin extending transversely of said flow passage and having end portions thereof located within said hinge pin receptacles with the center-line thereof substantially coincident with said Y-axis and offset from said X-axis; and (c) a check valve disc being movably positioned within said flow passage and forming hinge bushing means eccentrically located relative to the intersection of said X and Y axes, said hinge pin being received in loose fitting linearly and pivotally movable relation within said hinge bushing means, said hinge pin being of less dimension than said hinge pin receptacles in one axial direction permitting linear movement of said hinge pin within said hinge pin receptacles said check valve bushing means being rotatable about said hinge pin, thus permitting said check valve disc to have components of rotary and linear movement relative to said hinge pin and seat means during both opening and closing movement.

2. A check valve mechanism as recited in claim 1, including:
means urging said check valve disc toward the seated position thereof.

3. A check valve mechanism as recited in claim 2, wherein said urging means comprises:
a torsion spring having a central portion encircling said hinge pin and end portions in respective force transmitting engagement with said body means and said check valve disc.

4. A check valve mechanism as recited in claim 3, wherein:
said body means defines a spring retainer receptacle receiving one end portion of said torsion spring, said spring retainer receptacle retaining said one end portion of said torsion spring in the event of spring breakage.

5. A check valve mechanism as recited in claim 4, wherein:
(a) said spring retainer receptacle is of U-shaped configuration; and
(b) said torsion spring is a double torsion spring defining a reverse bent intermediate portion forming said one end portion, said reverse bent intermediate portion being received within said U-shaped spring retainer receptacle.

6. A check valve mechanism as recited in claim 1, wherein:
(a) said seat means is of circular tapered form; and
(b) said check valve disc forms a circular sealing surface of tapered form positioned for mating sealing engagement with said tapered circular seat means.

7. A check valve mechanism as recited in claim 6, wherein:
(a) said check valve forms a circular seal groove about the periphery thereof, said seal groove having intersecting relation with said tapered sealing surface; and
(b) a circular sealing element being located within said seal groove and being disposed for sealing engagement with said tapered seat means.

8. A check valve mechanism as recited in claim 7, wherein:
said sealing element is composed of elastomeric material and is stretched in the range from 2% to 15% in the nonpressurized state of said valve mechanism.

9. A check valve mechanism as recited in claim 1, wherein:
said outer body ring forms opposed flange engaging faces located for sealed assembly with pipe flanges.

10. A check valve mechanism as recited in claim 1, including:
means locking said seat insert within said seat recess.

11. A check valve mechanism as recited in claim 10, wherein:
(a) said seat insert and said body ring define registering locking groove means; and
(b) a circular locking ring is receivable within said locking groove means and functions to retain said seat insert within said seat recess.

12. A check valve mechanism as recited in claim 1, wherein:
each of said hinge pin receptacles is defined in part by generally parallel opposed surfaces of greater spacing than the diameter of said hinge pin.

13. A check valve mechanism as recited in claim 12, wherein:
each of said hinge pin receptacles is also defined by a pivot surface which is out of engagement with said hinge pin in the seated condition of said valve disc and engages said hinge pin upon linear unseating movement of said valve disc.

14. A check valve mechanism as recited in claim 13, wherein:
said pivot surface is of planar configuration and is disposed in substantially normal relation to said generally parallel opposed surfaces.

15. A check valve mechanism, comprising:
(a) body means forming a horizontal centerline defining a flow passage and forming an internal circular seat recess;
(b) a generally circular seat insert being positioned within said internal circular seat recess and forming circular seat means, said circular seat insert further forming opposed hinge pin receptacle slots of generally rectangular form, said hinge pin receptacle means being positioned in offset relation with said horizontal center-line;
(c) a hinge pin extending transversely of said flow passage and having end portions thereof located for linear and rotational movement within said hinge pin receptacle slots; and
(d) a check valve disc being movably positioned within said flow passage and forming hinge bushing means located in eccentric relation with the center of said check valve disc, said hinge pin being received in loose fitting linearly and pivotally movable relation within said hinge bushing means, said hinge pin being of less dimension than that of said pin receptacle slots permitting linear movement of said hinge pin within said hinge pin receptacle slots and permitting said check valve disc to have components of rotary and linear movement relative to said seat means during both opening and closing movement thereof.

16. A check valve mechanism as recited in claim 15, wherein:

said valve body and seat insert cooperate to form one sealing face of said valve mechanism for sealing engagement with a pipe flange.

17. A check valve mechanism as recited in claim 15, wherein:
  (a) said seat recess is defined in part by a radial abutment surface; and
  (b) said hinge pin receptacle slots of said seat insert are closed by said radial abutment surface for entrapment of the ends of said hinge pin within said hinge pin receptacle slots .

* * * * *